Sept. 17, 1957     B. A. WHITNEY     2,806,339
ROTARY DISC LAWN MOWER
Filed Jan. 19, 1955     2 Sheets-Sheet 1

INVENTOR.
BYRL A. WHITNEY
BY
Milburn & Milburn
ATTORNEYS

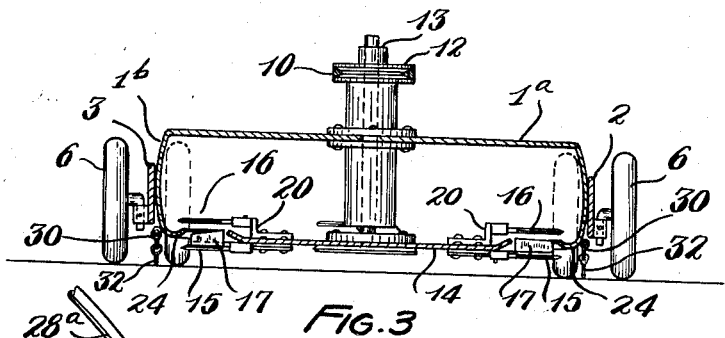
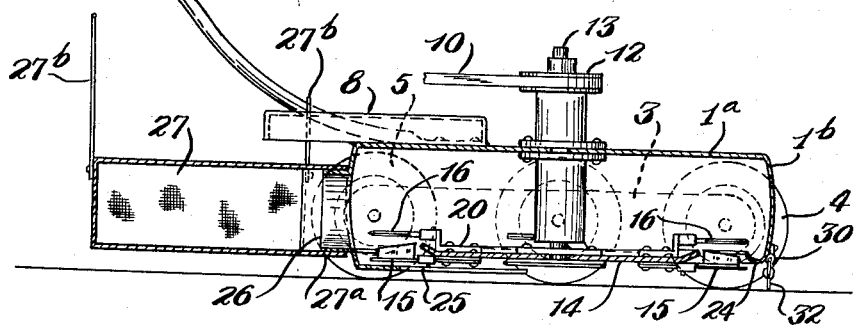
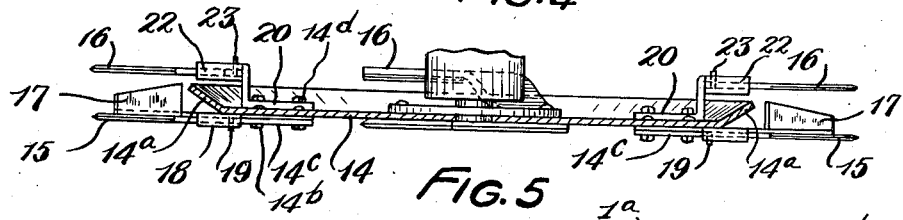
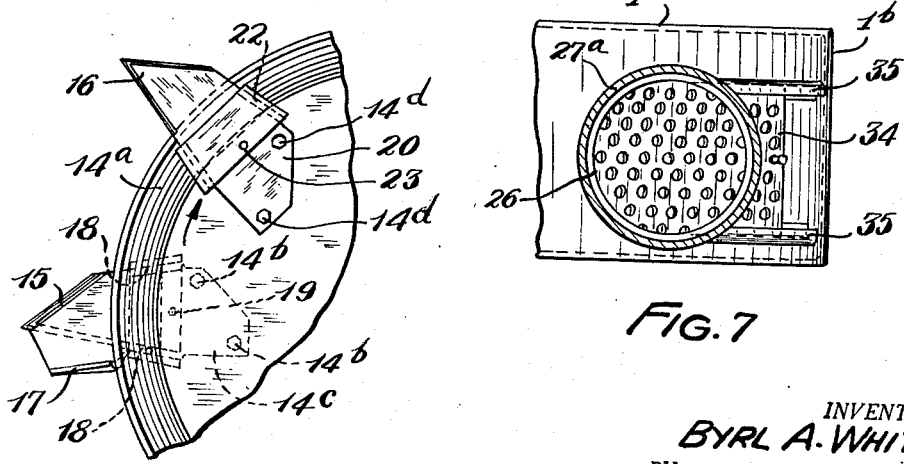

United States Patent Office 2,806,339
Patented Sept. 17, 1957

2,806,339

ROTARY DISC LAWN MOWER

Byrl A. Whitney, Lakewood, Ohio

Application January 19, 1955, Serial No. 482,779

7 Claims. (Cl. 56—25.4)

This invention relates to the general art of lawn mowers and cleaners and is an improvement over the device disclosed in my co-pending application Serial No. 451,615, filed August 23, 1954, and now Patent No. 2,734,327.

As in the above co-pending application, so here also the invention relates to the rotor type of mower in which the cutting blades are rotated about a vertical axis.

One object of my present invention is to provide such a device with a rotary carrier pan upon which are mounted the blades for the mowing operation and also chopping blades for a still further comminution of the grass, leaves, etc.

Another object is to provide at the rear part of such a device an improved chopping block that affords increased capacity for further chopping of the grass, leaves, etc. before the same are deposited into the catcher at the rear end of the machine.

Another object is to provide such a device with an improved form of catcher for more efficient discharge of the grass, leaves, etc., thereinto and an improved manner of mounting the same for ready emptying of the same.

Another object is to provide such a device with means for preventing scuffing of the lawn in the case of hummocks over which the device must pass and which would otherwise be cut by the blades because of the raised elevation of the hummocks between the front and rear wheels at any given time.

Another object is to provide such a device with an improved means for adapting the same to be employed for cleaning a drive-way or the like without the danger of the litter therefrom being discharged outwardly beneath the body of the machine.

Other objects of my present invention consist in the specific forms of mechanism that I have here disclosed for the accomplishment of the several general objects hereinabove noted as well as further objects that might appear from the following description and claims when considered together with the accompanying drawing.

Fig. 3 is a view taken on line 3—3 of Fig. 1;

Fig. 4 is a view taken on line 4—4 of Fig. 1;

Fig. 5 is an enlarged view of a portion of Fig. 4 so as to more clearly illustrate the rotary carrier pan with its mowing and chopping blades thereupon;

Fig. 6 is an enlarged partial plan view illustrating the arrangement and manner of mounting the blades upon the carrier pan;

Fig. 7 is an enlarged view taken on line 7—7 of Fig. 2;

Figure 1:
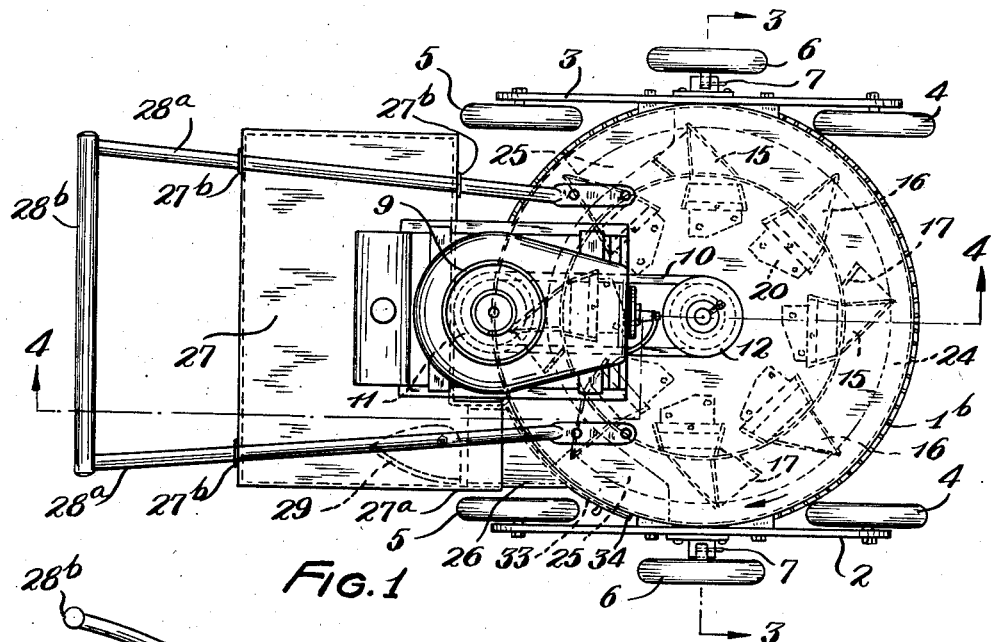
Fig. 1 is a top plan view of my present form of device.
Figure 2:
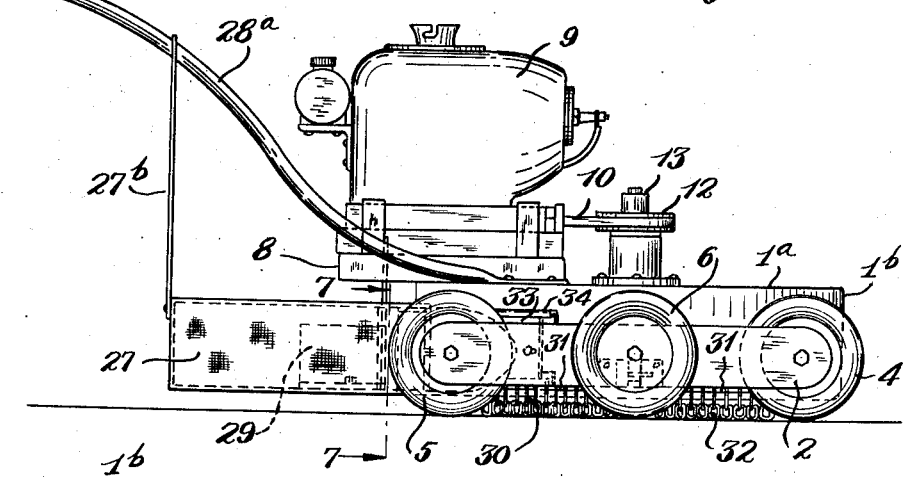
Fig. 2 is a side elevation of the same.
Figure 8:
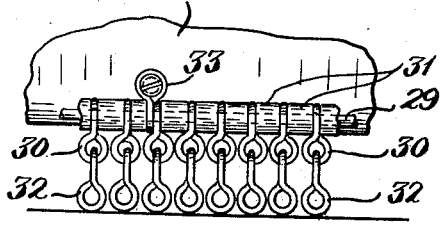
Fig. 8 is an enlarged partial elevation of the skirt depending from the bottom of the machine bottom.

The chassis may be of substantially circular form with its top part 1a and its depending side wall portion 1b. Secured to the opposite sides of the depending wall portion 1b are the parallel rigid bars 2 and 3 for supporting the wheels. The pairs of front and rear wheels 4 and 5 are mounted near the forward and rearward ends of the bars 2 and 3 and upon the inner side thereof. Also I have provided the intermediate diametrically oppositely located wheels 6 that have their hubs removably mounted upon the outside of the bars 2 and 3 by means of sockets and the removable pins 7, the provision of the wheels 6 being for the purpose of avoiding scuffing of any hummocks or other uneven parts of the lawn by the mower blades. That is, the wheels 6 will serve to maintain the normal elevation of the mower blades above any such uneven parts of the lawn while passing thereover.

Upon the top of the chassis there is provided the base 8 upon which the internal combustion engine or motor 9 or other form of motive means may be mounted; and there is the belt connection 10 between the pulleys 11 and 12 of the motor and the vertically disposed shaft 13, respectively, the shaft 13 being located in the center of the chassis or body of the machine and extending to the inside thereof. Upon the lower end of the shaft 13 there is mounted the carrier pan or plate 14 which carries the four mowing blades 15 and the four chopping blades 16.

The pan 14 is here shown as of flat imperforate form with an upturned annular marginal portion 14a at an angle of approximately thirty degrees. The pan 14 will practically close the bottom of the machine; that is, except about the edge of the pan 14. To the under-side of the flat main part of the carrier pan 14 there are secured, as for instance by means of the bolts 14b, the two pairs of brackets 14c which extend radially beyond the flange 14a and have their trailing edges formed as deflecting vanes or fins 17. The opposite edges of the brackets 14c are, in each case, formed as an outwardly converging socket 18 to receive the correspondingly converging rear edges of the mowing blades 15 so as to permit these blades to be moved radially outwardly by centrifugal force during operation of the machine. The cutting edges of the mowing blades 15 are arranged forward of the deflecting vane 17 in each instance in their path of travel and may be set at an angle of approximately forty-five degrees to the diameter of the carrier pan 14, as indicated in the present drawing. Each blade 15 is retained in assembly during periods of idleness by means of the removable pin or bolt 19 and, with this arrangement, each individual blade may yield in case it strikes an obstruction but will be returned to normal operative position by centrifugal force after passing the obstruction, thereby precluding damage to the edge of the blade and prolonging its life of usefulness. Also, these blades may be easily and quickly removed and sharpened or replaced. The rear edge portion of each vane 17 is curved upwardly and inwardly towards the cutting edge of the blade and is flared outwardly and rearwardly towards its radially outward end so as to deflect the cut grass, leaves, etc., as they are cut by the mowing blade 15, upwardly, outwardly and circumferentially about the front and side wall portions of the body of the machine.

Attached by means of the like bolts 14d to the upper surface of the main flat part of the carrier pan 14 are the two pairs of duplicate diametrically disposed brackets 20 for the chopping blades 16 at the outer ends thereof. Each blade 16 is here shown of the same form and as mounted in the same manner as the lower mowing blades 15, the inclined socket for each of the blades 16 being here indicated by reference numeral 22 and the removable stop pin or bolt at the rear thereof in each instance being indicated by reference numeral 23. No deflector vanes are necessary in the case of the chopping blades 16. The brackets 20 are made of strap iron that are readily bent into the angular form herein indicated. The middle part of each bracket arm 20 is bent upwardly and outwardly so as to clear the flange 14a. Thus the inner and outer end portions of each bracket 20 extend in a horizontal parallel manner; and the chopping blades 16, as here shown, are spaced approximately one inch above the plane of the mowing blades 15. As indicated, the mowing and chopping blades will be arranged in a staggered or alternating manner about the carrier pan 14.

In the plane between those of the mowing and chopping blades and in substantially the same plane as that of the main part of the carrier pan 14 there is located the race-way 24 which is here formed by curving the lower edge portion of the side wall of the machine body inwardly and upwardly. This race-way, as here shown, extends about the greater part of the body of the machine and terminates at points in the rear part thereof, as indicated in Fig. 1 of the present drawings. The purpose of this race-way is to catch the cut grass, leaves, etc. as they are thrown upwardly, outwardly and circumferentially by the deflector vanes or fins 17 which will cause such cut material to be transferred to and to be moved about the race-way to the rear end thereof where it will be transferred onto the chopping block therebelow. This chopping block or table, as here shown, extends about the rear of the machine body and forwardly to points just to the rear of the transverse diameter of the machine body. In this way the chopping block or table 25 will extend sufficiently forward to over-lap the race-way 24 and to permit a complete chopping action by the blades 16 and yet the chopping block or table will not interfere with the operation of the mowing blades 15 in a plane therebelow.

The grass, leaves, etc. that are cut by the mowing blades 15 will be forced upwardly by the action of the vanes or fins 17 and will be received within the race-way 24 and moved thereabout towards the rear end thereof and thence transferred to the chopping table 25. At the same time some of the cut grass, leaves, etc. may be received upon the carrier pan 14 which will thus prevent such material from falling upon the ground; and this material as well as that within the race-way may be subjected to a still further comminution by the chopping blades 16, all of which material will be thrown into and propelled about the race-way 24. The blades 16 will perform such further chopping action upon all such material that may lodge upon the carrier pan 14 and the chopping block 25 and until such material is discharged rearwardly from the chopping block.

Such chopped material will be discharged from the chopping block 25 through the narrow throat 26 at the rear and to one side of the body of the machine, this throat being located at the one side according to the direction of rotation of the blades and extending in a direction corresponding to the tangent of the path of rotary movement of the carrier pan 14. For instance, in the present case the direction of such rotation is illustrated as being clockwise (Figs. 1 and 6), and accordingly this throat is located at the right side as viewed from a position looking forward from the rear of the machine. As indicated in Fig. 4 of the present drawings, the throat 26 is in a plane adapted to receive the cut material from the end of the race-way and from the rotary carrier pan 14 as well as the chopping block 25 as it is discharged therefrom in the manner above described. The throat 26 has removably fitted thereabout by frictional engagement the correspondingly shaped neck portion 27a at the forward end of the catcher 27 into which the cut material is adapted to be deposited. The catcher 27 may be made of any suitable material. This catcher is here shown as extending entirely across the rear end of the machine and with upright arms 27b which are adapted to be removably engaged over the side arms 28a of the chassis or body handle, the rear transverse part of which is here indicated by reference numeral 28b. Upon the inside of the catcher 27 and at one side thereof I have provided a curved deflector plate 29 which is located in the path of the cut material as it is discharged through the narrow entrance to the catcher. The purpose of this deflector 29 is to cause such cut material to be first deposited at the opposite side of the catcher 27 and to thus fill the same from the far side towards the near side thereof, thereby ensuring that the catcher will be completely filled before having to remove the same for emptying.

In order to empty the catcher 27 it is merely necessary to detach the upper ends of the arms 27b and to disengage the forward end of the catcher from the throat, whereupon the contents of the catcher may be deposited at any place desired. Or, if preferred, the upper ends of the arms 27b may be detached and the catcher may be turned about the throat portion 26 and the contents of the catcher deposited upon the adjacent ground or upon a cloth or into another receptacle; this manipulation being effected without entirely removing the catcher from its position in the machine. By making the arms 27b rigid, they may be employed as a handle means for removing the catcher 27 and depositing its contents wherever desired.

It is of course understood that when this machine is employed upon a lawn, the upstanding grass at the sides will serve as a curtain to prevent the cut grass, leaves, etc. from being discharged outwardly from beneath the machine. In order to adapt this machine for use in removing maple seeds and other such litter from a paved driveway or the like where there is no such curtain at the side of the machine, I have here provided a simple and efficient form of means for this purpose. Such means may extend about the entire lower part of the machine except that it is not necessary at the rear thereof where the catcher is located to receive the litter that is discharged thereinto. My present form of such means consists of a round wire or rod 29 which has strung loosely thereupon the eyes of conventional chain links 30 which are here spaced apart by rubber rings 31 upon the same wire or rod 29. Suspended loosely from the lower eye of each such chain link is a duplicate chain link 32. These chain links are of sufficient weight that they will normally hang down so as to form a curtain and, at the same time, they will yield to any temporary obstruction. Whereas I have here shown two chain links connected together in each instance, it is to be understood that this feature is not limited to any particular number of such links.

With my present improved means for chopping the cut grass, leaves, etc., there is probably precluded the necessity of a grill; but such further means of comminution may be provided in the form of the apertured plate 34 which may be removably slid into position across the end of the throat 26 by means of the grooves 35 at the upper and lower edges thereof. Whether to employ a grill may be determined according to whether the grass, leaves, etc. are wet. One principal advantage of the present machine is that it is capable of mowing and chopping wet grass, leaves, etc. and discharging the same into the catcher without clogging at any point throughout the entire operation as herein described. Dry condition of the leaves, grass, etc. will permit the use of a grill that will effect still further comminution of the same.

The practical advantages of my present machine are thought to be obvious from the above. Briefly, this machine is capable of ensuring most efficient operation under even most adverse conditions that would ordinarily be regarded as practically impossible. The cut grass, leaves, etc. are prevented from falling upon the ground and they will all be subjected to a most thorough chopping action before being deposited in the catcher. There is precluded the danger of scuffing any hummocks or other raised portions in the ground surface. It is possible to employ this machine also for the removal of litter from a paved surface and to gather the same within the catcher of the machine. The grass, leaves and other litter may be collected within the catcher in an efficient manner and the filled catcher may be emptied in an efficient and convenient manner. In a word, my present machine is capable of most efficient operation in the mowing and cleaning of the lawn or a drive-way or the like and in the comminution and removal of such material, thereby permitting all such material to be removed and deposited at any desired point instead of clogging the pores of the lawn soil with thatches of such litter, which results from persistent return of such material to the lawn. However, under certain conditions and to a certain extent it may at times be desirable and beneficial to return some of the finely comminuted material to the soil of the lawn; and, this may be accomplished with my present machine by merely removing the catcher and permitting the material to be deposited upon the lawn as the mowing operation is being performed. Another advantage of my present machine resides in the fact that the further comminution of the grass, leaves, etc., as above described, is effected during the mowing operation and without requiring any change in the machine for the performance of these several operations. With a finer comminution of the grass, leaves, etc., as above described, a greater quantity of such material may be packed into the catcher and it will not be necessary to empty the catcher as often as otherwise.

Other practical advantages of my present machine will no doubt be apparent to those who are familiar with the art to which this invention relates.

What I claim is:

1. In a mowing machine, the combination of a wheeled vehicular enclosure body having closed top, side and front walls and being open at the rear and bottom thereof, the lower part of said side and front walls extending inwardly and being formed as a race-way thereabove with open rear ends, a carrier pan rotatably mounted about a vertical axis and having its shaft of rotation extending through said body top, motive means mounted upon said body top and having operative drive connection with said shaft, mowing and chopping means mounted upon and extending outwardly from the marginal portion of said carrier pan in staggered relation below and above the plane of said race-way, respectively, said mowing means having upwardly, inwardly turned and outwardly opening inclined fin means located rearwardly in the path of rotation thereof so as to propel the cut grass etc. upwardly into the path of said chopping means and into and about said race-way for discharge at the rear end thereof.

2. The same structure as recited in claim 1 hereof and in which said carrier pan is of imperforate form and of a diameter approximating the interior diameter of said raceway, and in which said mowing and chopping means are in the form of lower and upper diametrically arranged pairs of blades terminating within the inner diameter of said race-way and in which said lower and upper blades alternate with each other.

3. The same structure as recited in claim 1 hereof and in which said carrier pan is of imperforate form and has an upwardly and outwardly extending marginal flange thereabout and is of substantial diameter approximating the internal diameter of said race-way, and in which said mowing and chopping means are in the form of lower and upper diametrically arranged pairs of blades terminating within the internal diameter of said race-way and in which said lower and upper blades alternate with each other, and in which said upper blades have means of attachment extending over said marginal flange of said carrier pan.

4. The same structure as recited in claim 1 hereof and in which there is included also a stationary chopping platform upon said body at the rear end of said race-way and occupying a plane below that of said mowing means, said chopping platform extending substantially forwardly at both ends thereof and having a substantial depth in a direction longitudinally of the machine.

5. In a mowing machine, the combination of a wheeled vehicular enclosure body having closed top, side and front walls and being open at the rear and bottom thereof, the lower part of said side and front walls extending inwardly and being formed as a race-way thereabove with open rear ends, an angularly disposed mowing means occupying a substantially horizontal plane below and adjacent to said race-way and rotatably mounted upon a vertical axis and having its shaft of rotation extending through said body top, motive means mounted upon said body top and having operative drive connection with said shaft, and said mowing means having an upwardly, inwardly turned and outwardly opening inclined fin located rearwardly in the path of rotation thereof so as to propel the cut grass etc. upwardly into and circumferentially about said race-way for discharge therefrom at the rear end thereof, said body having a discharge opening at one side of the rear thereof and corresponding substantially to the tangent of the rotational path of movement of said mowing means and according to the direction of rotation so as to discharge the mowed grass etc. into said opening, and a container having a throat removably connected to said discharge opening.

6. In a mowing machine, the combination of a wheeled vehicular enclosure body having closed top, side and front walls and being open at the rear and bottom thereof, the lower part of said side and front walls extending inwardly and being formed as a race-way thereabove with open rear ends, a mowing means occupying a substantially horizontal plane below and adjacent to said race-way and rotatably mounted about a vertical axis having its shaft of rotation extending through said body top, motive means mounted upon said body top and having operative drive connection with said shaft, and a skirt depending from the bottom of said body to prevent discharge of litter from beneath said body, said skirt comprising a series of adjacent members pivotally mounted for individual movement radially of the plane of rotation of said mowing means.

7. The same structure as recited in claim 6 hereof and in which said skirt comprises a rod extending about the lower part of said body and a plurality of chain links with end loops strung upon said rod and depending freely therefrom and having spacer means mounted upon said rod between said chain links.

References Cited in the file of this patent
UNITED STATES PATENTS

| | | |
|---|---|---|
| 1,622,611 | Sera | Mar. 29, 1927 |
| 2,578,880 | Doyle | Dec. 18, 1951 |
| 2,659,191 | Miller et al. | Nov. 17, 1953 |